United States Patent Office 3,424,765
Patented Jan. 28, 1969

3,424,765
OSMIUM TETRA-OXIDE-p-DIOXANE COMPLEX
AND THE PRODUCTION THEREOF
Charles J. Norton, Denver, Colo., assignor to Marathon Oil Company, Findlay, Ohio, a corporation of Ohio
No Drawing. Original application Oct. 23, 1965, Ser. No. 504,184. Divided and this application Dec. 26, 1967, Ser. No. 709,154
U.S. Cl. 260—340.6                    2 Claims
Int. Cl. C07f 15/00; C07c 29/04

This application is a divisional of Ser. No. 504,184, filed Oct. 23, 1965, and assigned to Marathon Oil Company.

This invention relates to an osmium tetraoxide complex and processes for its preparation and use as a catalyst. More particularly, it is concerned with the complex formed by reacting para-dioxane with osmium tetraoxide and the use thereof as a catalyst.

Osmium tetraoxide is well known in the art as an excellent catalyst for the hydroxylation of olefinic and acetylenic bonds. In the Milas type reaction it generally produces greater yields than other catalysts utilized in hydroxylation processes at milder reaction conditions. However, the utilization of the osmium tetraoxide has been restricted to laboratory experiments because of certain inherent drawbacks.

One great disadvantage in utilizing osmium tetraoxide is its low melting point (41° C., Handbook of Chemistry and Physics, 45th Ed., 1964, The Chemical Rubber Company, page 3200) and corresponding high volatility in air (130° C. ibid.). This high volatility results in considerable lose of valuable osmium when osmium tetraoxide is employed as a catalyst. Another drawback of employing osmium tetraoxide is its high toxicity to human beings. Solution of these problems requires considerable expense and extreme care in handling the catalysts.

The present invention provides a low volatility, highly active osmium tetraoxide catalyst which may be handled with relative safety and ease.

The problems encountered in the prior art are alleviated and the foregoing advantages obtained through the discovery that osmium tetraoxide reacts with p-dioxane to form a well-defined, solid complex. The complex is highly active in catalyzing hydroxylation reactions; in fact, it is more effective than heretofore well-known osmium catalysts.

The complex is synthesized by pouring an excess of the p-dioxane over osmium tetraoxide crystals at room temperature and pressure. The reaction takes place immediately as the p-dioxane permeates the osmium tetraoxide crystals and an opaque, light yellow precipitate is formed. The precipitate appears to mushroom on the surface of the translucent yellow osmium tetraoxide crystals. The mixture is chilled, filtered by vacuum, and rinsed in small amounts of inert petroleum ether. Subsequently, it is dried on filter plates under a partial vacuum for a short time. The two reactants should be brought into contact at a temperature of between 10° C. and 100° C. though more preferably at temperatures of between 20° C. and 60° C. The pressure is preferably maintained at atmospheric, although a range of 0.1 to 10 atm. is suitable. The novel osmium tetraoxide-p-dioxane complex has a melting point of about 74–75° C. This melting point is considerably higher than that of osmium tetraoxide. The higher melting point results in the catalyst being in a stable form at most handling conditions and consequently makes it safer to utilize.

The catalyst thus prepared is employed in hydroxylation reactions under conditions, feed stocks, and catalyst ratios, etc., known to the art.

Suggested reactants for the hydroxylation reaction include organic compounds containing at least one unsaturated carbon-carbon bond of nonaromatic character, such as alkenes, cycloalkenes, dienes, and acetylenes. Also, members of the foregoing classes containing substituted side chains are excellent feed stock, such as allyl alcohol, vinyl chloride, isoprene, styrene, and unsaturated polymers thereof, etc.

The complex is prepared for the hydroxylation reaction by dissolving it in an inert solvent, especially liquid tertiary alcohols, for example t-butyl alcohol. Hydrogen peroxide, preferably dissolved in the same solvent, may then be added to the dissolved catalyst. The reaction of olefins with $OsO_4$ is violently exothermic; one of the functions of the solvent is to serve as a heat moderating and dissipating medium. The ratio of molar concentration of hydrogen peroxide in the hydrocarbon solvent should be about 0.1 to 10 molar with a more desired range of 0.5 to 5 molar. Tertiary butyl alcohol is a preferred solvent although many others, such as ethers, esters, hydrocarbons, etc., may be used.

The catalyst may be employed under a wide range of conditions well known in the prior art for reactions catalyzed by osmium tetraoxide. Reaction solution concentrations of the osmium tetraoxide-p-dioxane catalyst may be from about $10^{-8}$ to $10^{-2}$ molar, although preferably $10^{-6}$ to $10^{-3}$ molar. Conducting the reaction at a temperature between 0 and 150° C. is effective, though a preferred temperature range is 20 to 100° C. Pressure should be maintained in a range of 0.1 to 100 atm. and preferably 1 to 10 atm.

The spent catalyst which is reduced to osmium dioxide can be recovered from the reaction mixture according to well known methods; for example, the process as described in Smith et al., U.S. 2,773,101. The recovered osmium dioxide can then be converted to the osmium tetraoxide and recombined with purified dioxane to form more catalyst in accordance with the methods herein described.

The following examples are merely illustrative of preferred embodiments of the present invention and are in no way intended to limit the invention.

EXAMPLE I

At room temperature, to 1.0 g. of osmium tetraoxide crystals in a test tube is added dropwise 2.0 ml. of p-dioxane. An immediate chemical change occurred as the p-dioxane permeates the crystals and a light yellow opaque precipitate is formed. The reaction is stirred with a glass rod and allowed to continue for 5 minutes until all activity ceases. Thereafter, the mixture is chilled, filtered by a vacuum, and rinsed with small amounts of inert petroleum ether. After washing, the precipitate is dried on filter plates under a partial vacuum to obtain the osmium tetraoxide-p-dioxane complex M.P. 74.0–75.5° C. in a good yield.

EXAMPLE II 58 mg. of the complex prepared as in Example I is dissolved in 50 ml. of 2-molar hydrogenperoxide in tertiary butyl alcohol. This mixture is put in a 500 ml. Parr reaction vessel with an initial atmosphere of about 30 p.s.i.g. propene. The mixture is allowed to react exothermally for approximately 1 hour (Table 1).

TABLE 1

| T., min. | Reaction temperature, °C. | Propene pressure, p.s.i.g. |
|---|---|---|
| 0 | 20 | 31 |
| 1 | 32 | 39 |
| 1.5 | 50 | 46 |
| 2 | 72 | 52.5 |
| 3 | 77 | 44 |
| 5 | 77 | 39 |
| 12 | 72 | 31 |
| 15 | 72 | 29 |
| 20 | 65 | 26.5 |
| 55 | 23 | 23 |

A total of 0.1 moles of $H_2O_2$ reacts with 0.06 mole of propene, giving about 60% yield of propylene glycol as confirmed by gas-liquid chromatographic analysis of the reaction product mixture. The infrared spectrum of osmium tetraoxide has absorption bands at about 10.3 and 10.4 microns. These bands are absent in the complex. Further, the carbon-hydrogen bands in the complex are not visible. Conversely, the carbon-hydrogen bands, observed in benzene by NMR, are indistinguishable from those of dioxane, indicating the complex is dissociable in hydrocarbon solvents. The average gram molecular weight obtained in benzene is 183. This weight is close to the average theoretical gram molecular weight of 171 after dissociation and indicates the complex is made up of one molecule of $OsO_4$ and one molecule of p-dioxane.

What is claimed is:
1. A process for preparing an osmium tetraoxide-p-dioxane complex catalyst comprising contacting osmium tetraoxide with p-dioxane.
2. The complex consisting essentially of osmium tetraoxide-p-dioxane.

References Cited
UNITED STATES PATENTS
2,437,648   3/1948   Milas _____ 260—617

ALEX MAZEL, Primary Examiner.
JAMES H. TURNIPSEED, Assistant Examiner.

U.S. Cl. X.R.
252—429, 431; 260—635